United States Patent
Gao et al.

(10) Patent No.: US 10,311,861 B1
(45) Date of Patent: Jun. 4, 2019

(54) SYSTEM AND METHOD FOR ENCODING DATA IN A VOICE RECOGNITION INTEGRATED CIRCUIT SOLUTION

(71) Applicant: GYRFALCON TECHNOLOGY INC., Milpitas, CA (US)

(72) Inventors: Xiang Gao, San Jose, CA (US); Lin Yang, Milpitas, CA (US); Wenhan Zhang, Mississauga (CA)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 15/871,933

(22) Filed: Jan. 15, 2018

(51) Int. Cl.
*G10L 15/16* (2006.01)
*G10L 15/06* (2013.01)
*G10L 15/22* (2006.01)
*G10L 25/18* (2013.01)
*G06N 3/08* (2006.01)

(52) U.S. Cl.
CPC ............ *G10L 15/16* (2013.01); *G06N 3/08* (2013.01); *G10L 15/063* (2013.01); *G10L 15/22* (2013.01); *G10L 25/18* (2013.01)

(58) Field of Classification Search
CPC ....... G10L 15/16; G10L 15/063; G10L 15/22; G10L 25/18; G06N 3/08
See application file for complete search history.

(56) References Cited

U.S. PATENT DOCUMENTS

| 2016/0217367 A1* | 7/2016 | Moreno ............. G10L 15/16 |
| 2018/0046913 A1* | 2/2018 | Yu ..................... G06N 3/08 |
| 2018/0190268 A1* | 7/2018 | Lee ................... G10L 15/16 |
| 2018/0315399 A1* | 11/2018 | Kaul .................. G06N 3/063 |

* cited by examiner

*Primary Examiner* — Sonia L Gay
(74) *Attorney, Agent, or Firm* — Dorsey & Whitney LLP (57) ABSTRACT

Methods of encoding voice data for loading into an artificial intelligence (AI) integrated circuit are provided. The AI integrated circuit may have an embedded cellular neural network for implementing AI tasks based on the loaded voice data. An encoding method may generate a two-dimensional (2D) frequency-time array from an audio waveform, apply a probability function to the 2D frequency-time array to generate a set of 2D arrays, load the set of 2D arrays into the AI integrated circuit, execute programming instructions contained in the AI integrated circuit to feed the set of 2D arrays into the embedded cellular neural network in the AI integrated circuit to generate a voice recognition result, and output the voice recognition result. The encoding method also trains a convolution neural network (CNN) and loads the weights of the CNN into the AI integrated circuit for implementing the AI tasks.

16 Claims, 8 Drawing Sheets

SYSTEM AND METHOD FOR ENCODING DATA IN A VOICE RECOGNITION INTEGRATED CIRCUIT SOLUTION

FIELD

This patent document relates generally to encoding data into an artificial intelligence integrated circuit, and in particular, to encoding data in a voice recognition integrated circuit solution.

BACKGROUND

Solutions for implementing voice and/or image recognition tasks in an integrated circuit face challenges of losing data precision or accuracy due to limited resources in the integrated circuit. For example, a single low-power chip (e.g., ASIC or FPGA) for voice or image recognition tasks in a mobile device is typically limited in chip size and circuit complexity by design constraints. A voice or image recognition task implemented in such a low-power chip cannot use data that has the same numeric precision, nor can it achieve the same accuracy as when performing the tasks in a processing device of a desktop computer. For example, an artificial intelligence (AI) integrated circuit (i.e., a chip) in a mobile phone may have an embedded cellular neural network (CeNN) architecture that has only 5 bits per channel to represent data values, whereas CPUs in a desktop computer or a server in a cloud computing environment use a 32-bit floating point or 64-bit double-precision floating point format. As a result, image or voice recognition models, such as a convolutional neural network, when trained on desktop or server computers and transferred to an integrated circuit with low bit-width or low numeric precision, will suffer a loss in performance.

This patent disclosure is directed to systems and methods for addressing the above issues and/or other issues.

SUMMARY

Methods of encoding voice data for loading into an artificial intelligence (AI) integrated circuit are provided. The AI integrated circuit may have an embedded cellular neural network for implementing AI tasks based on the loaded voice data. An encoding method may include: receiving voice data comprising at least a segment of an audio waveform; generating a two-dimensional (2D) frequency-time array comprising a plurality of pixels; applying a probability function to the 2D frequency-time array to generate a set of 2D arrays; and loading the set of 2D arrays into the AI integrated circuit. The method may also include: executing one or more programming instructions contained in the AI integrated circuit to feed the set of 2D arrays into an embedded cellular neural network architecture in the AI integrated circuit; generating a voice recognition result from the cellular neural network architecture based on the set of 2D arrays; and outputting the voice recognition result.

The encoding method also includes training one or more weights of a convolutional neural network for AI tasks. In some scenarios, the encoding method includes: receiving a set of sample training voice data comprising at least one sample segment of an audio waveform; using the set of sample training voice data to generate one or more sample 2D frequency-time arrays; applying the probability function to each of the one or more sample 2D frequency-time arrays to generate a set of 2D training arrays; using the set of 2D training arrays to train one or more weights of a convolutional neural network; and loading the one or more trained weights into the embedded cellular neural network architecture of the AI integrated circuit.

In some scenarios, the probability function may include a plurality of entries representing a range of intensity values of the audio waveform. In some scenarios, the probability function may include a plurality of entries representing a range of frequency values of the audio waveform. Generating the set of 2D arrays may include: for each pixel in the 2D frequency-time array, applying the probability function to a value of each pixel to determine values of corresponding pixels in the set of 2D arrays. The 2D frequency-time array may be a 2D spectrogram.

BRIEF DESCRIPTION OF THE DRAWINGS

The present solution will be described with reference to the following figures, in which like numerals represent like items throughout the figures.

DETAILED DESCRIPTION

It will be readily understood that the components of the present solution as generally described herein and illustrated in the appended figures could be arranged and designed in a wide variety of different configurations. Thus, the following more detailed description of various implementations, as represented in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments which may not be present in all embodiments of the present solution.

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Unless defined otherwise, all technical and scientific terms used in this document have the same meanings as commonly understood by one of ordinary skill in the art.

Each of the terms "artificial intelligence logic circuit" and "AI logic circuit" refers to a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Each of the terms "integrated circuit," "semiconductor chip," "chip" and "semiconductor device" refers to an integrated circuit (IC) that contains electronic circuits on semiconductor materials, such as silicon, for performing certain functions. For example, an integrated circuit can be a microprocessor, a memory, a programmable array logic (PAL) device, an application-specific integrated circuit (ASIC) or others. An integrated circuit that contains an AI logic circuit is referred to as an AI integrated circuit or an AI chip.

Each of the terms "data precision," "precision" and "numerical precision" as used in representing values in a digital representation in a memory refers to the maximum number of values that the digital representation can represent. If two data values are represented in the same digital representation, for example, as an unsigned integer, a data value represented by more bits in the memory generally has a higher precision than a data value represented by fewer bits. For example, a data value using 5 bits has a lower precision than a data value using 8 bits.

Figure 1:
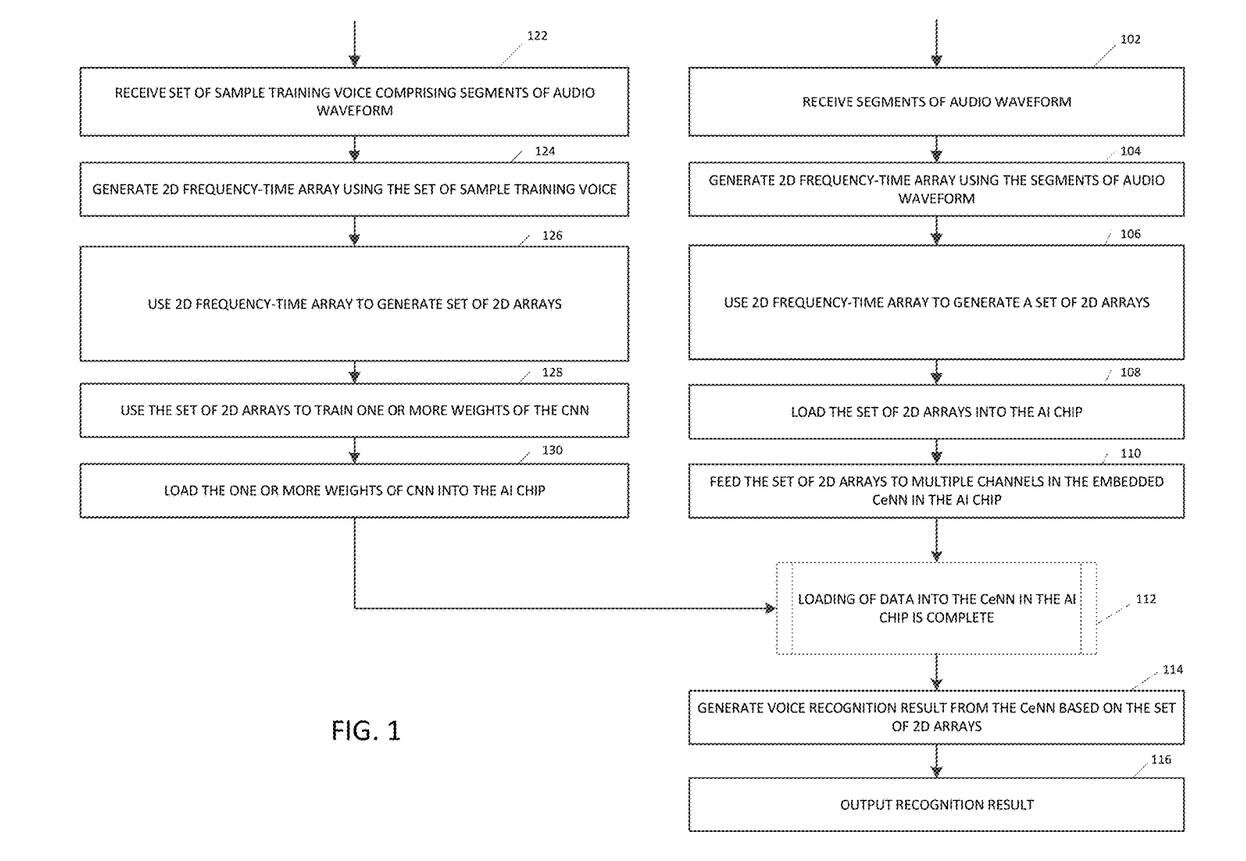
FIG. 1 illustrates a diagram of an example of a process for implementing a voice recognition task in an AI chip and training a convolution neural network for such recognition task.

With reference to FIG. 1, methods of encoding voice data for loading into an artificial intelligence (AI) integrated circuit are provided. The AI integrated circuit (i.e. a chip) may have an embedded CeNN which may include a number of channels for implementing various AI tasks. In some scenarios, an encoding method may include receiving input voice data comprising one or more segments of an audio waveform 102. A segment of an audio waveform may include an audio waveform of voice or speech, for example, a syllable, a word, a phrase, and/or a spoken sentence of any length. Receiving the input voice data may include receiving the data directly from an audio sensor, such as a microphone. Receiving input voice data may also include retrieving voice data from a memory. For example, the memory may contain voice data captured by an audio capturing device. The memory may also contain video data captured by a video capturing device, such as a video camera. The method may retrieve the video data and extract the audio data from the video data.

The encoding method may also include generating a 2D frequency-time array using the received voice data 104. There are various way of converting the audio signal to a 2D frequency-time array, such as Mel-frequency cepstral coefficient (MFCC) and wavelet transforms. The frequency-time 2D array contains information about the audio signal. For example, the frequency-time 2D array may be a spectrogram. In the case of a spectrogram, the 2D spectrogram may include an array of pixels (x, y), where x represents a time in the segment of the audio waveform, y represents a frequency in the segment of the audio waveform, each pixel (x, y) has a value representing an audio intensity of the segment of the audio waveform at time x and frequency y. There may be other ways of constructing the frequency-time 2D array. Thus, the method also may include: using the 2D frequency-time array to generate a set of 2D arrays 106; and loading the set of 2D arrays into the AI chip 108. Each of the 2D arrays in the set of 2D arrays also has an array of pixels that correspond to the array of pixels in the frequency-time 2D array. For example, when each 2D array in the set of 2D arrays has the same size as that of the frequency-time 2D array, a corresponding pixel in each respective 2D array resides at the same location. In loading the set of 2D arrays into the AI chip 108, each 2D array in the set may respectively loaded into a corresponding channel in the CeNN in the AI chip.

In generating the 2D array 106, each 2D array in the set of 2D arrays may include values with a lower precision and corresponding values in the set of 2D arrays may be combined to be equal or approximate to the value of each pixel in the 2D spectrogram with a higher precision. In other words, an AI chip that is capable of processing a lower precision data can be used to process input data with a higher precision, which reduces the loss of data precision caused by the constraints of the AI chip. Representing the 2D spectrogram by combining a set of 2D arrays and loading the set of 2D arrays into the AI chip will also "augment" the input data by creating a set of data. When the same step 106 is used for training sample data, the input data will be "augmented" so that less training data may be required. As a result, the AI chip will achieve higher accuracy and robustness against random noise. A number of methods to generate the set of 2D arrays will be explained in further detail later in this document.

In generating recognition results for the input voice data, the method may further include: executing, by the AI chip, one or more programming instructions contained in the AI chip to feed the set of 2D arrays 110 into multiple channels in the embedded CeNN in the AI integrated circuit. When loading of data into the CeNN in the AI Chip is complete 112, the method may include: generating a voice recognition result from the embedded CeNN based on the set of 2D arrays 114; and outputting the voice recognition result 116. Outputting the voice recognition result 116 may include storing a digital representation of the recognition result to a memory device inside the AI chip or outside the AI chip, the content of the memory can be retrieved by the application running the AI task, an external device or a process. The application running the AI task may be an application running inside the AI chip should the AI chip also have a processor. The application may also run on a processor external to the AI chip, such as a computing device or a server on the cloud, which may be electrically coupled to or may communicate remotely with the AI chip. Alternatively, and/or additionally, the AI chip may transmit the recognition result to a processor running the AI application or a display.

In a non-limiting example, the embedded CeNN in the AI chip may have a maximal number of channels, e.g., 3, 8, 16 or other numbers, and each channel may have a two-dimensional (2D) array, e.g., 224 by 224 pixels, and each pixel value may have a depth, such as, for example, 5 bits. Input data for any AI tasks using the AI chip must be encoded to adapt to such hardware constraints of the AI chip. For example, loading the set of 2D arrays 108 into the above example of AI chip having three channels may include loading a set of three 2D arrays of size 224×224, each pixel of the 2D array having a 5-bit value. The above described 2D array sizes, channel number and depth for each channel are illustrative only. Other sizes may be possible. For example, the number of 2D arrays for encoding into the CeNN in the AI chip may be smaller than the maximum channels of the CeNN in the AI chip.

In some scenarios, the embedded CeNN in the AI chip may store a convolutional neural network (CNN) that was trained and pre-loaded. The structure of the CNN may correspond to the same constraints of the AI chip. For example, for the above illustrated example of the embedded CeNN, the CNN may correspondingly be structured to have three channels, each having an array of 224×224 pixels, and each pixel may have a 5-bit value. The training of the CNN may include encoding the training data in the same manner as described in the recognition (e.g., block 104, 106), and an example of a training process is further explained.

With continued reference to FIG. 1, in some scenarios, a training method may include: receiving a set of sample training voice data that includes one or more segments of an audio waveform 122; and using the set of sample training voice data to generate one or more 2D frequency-time arrays, such as spectrograms 124. Each 2D frequency-time array is generated in a similar manner as in block 104, for example, a pixel (x, y) in the 2D spectrogram represents an audio intensity of the segment of the audio waveform at time x and frequency y. The training method may also include: using the one or more 2D frequency-time arrays to generate one or more sets of 2D training arrays 126. Each 2D training array may have pixel values with a lower precision, and corresponding values in each set of training 2D arrays are combined to represent the value of each pixel in the 2D spectrogram with a higher precision, in a similar manner as described previously with respect to block 106.

In FIG. 1, the training process may further include: using the one or more sets of 2D training arrays to train one or more weights of the CNN 128 and loading the one or more trained weights 130 into the embedded CeNN of the AI integrated circuit. In training the one or more weights of the CNN, the method may include: for each sample training voice data, receiving an indication of a class to which the sample training voice data belong. The type of classes and the number of classes depend on the AI recognition task. For example, a voice recognition task designed to recognize whether a voice is from a male or female speaker may include a binary classifier that assigns any input data into a class of male or female speaker. Correspondingly, the training process may include receiving an indication for each training sample of whether the sample is from a male or female speaker. A voice recognition task may also be designed to verify speaker identity based on the speaker's voice, as can be used in security applications.

In another non-limiting example, a voice recognition task may be designed to recognize the content of the voice input, for example, a syllable, a word, a phrase or a sentence. In each of these cases, the CNN may include a multi-class classifier that assigns each segment of input voice data into one of the multiple classes. Correspondingly, the training process also uses the same CNN structure and multi-class classifier, for which the training process receives an indication for each training sample of one of the multiple classes to which the sample belongs.

Alternatively, and/or additionally, in some scenarios, a voice recognition task may include feature extraction, in which the voice recognition result may include, for example, a vector that may be invariant to a given class of samples, e.g., a given person's utterance regardless of the exact word spoken. In a CNN, both training and recognition may use a similar approach. For example, the system may use any of the fully connected layers in the CNN, after the convolution layers and before the softmax layers. In a non-limiting example, let the CNN have six convolution layers followed by four fully connected layers. In some scenarios, the last fully connected layer may be a softmax layer in which the system stores the classification results, and the system may use the second to last fully connected layer to store the feature vector. There can be various configurations depending on the size of the feature vector. A large feature vector may result in large capacity and high accuracy for classification tasks, whereas a feature vector too large may reduce efficiencies in performing the voice recognition tasks.

The system may use other techniques to train the feature vectors directly without using the softmax layer. Such techniques may include the Siamese network, and methods used in dimension reduction techniques, such as t-Distributee Stochastic Neighbor Embedding (t-SNE), etc.

Now, how to generate the set of 2D arrays of values with a lower precision that can be combined to represent a higher precision value in the input data is further explained with reference to FIGS. 2 and 3.

Figure 2:
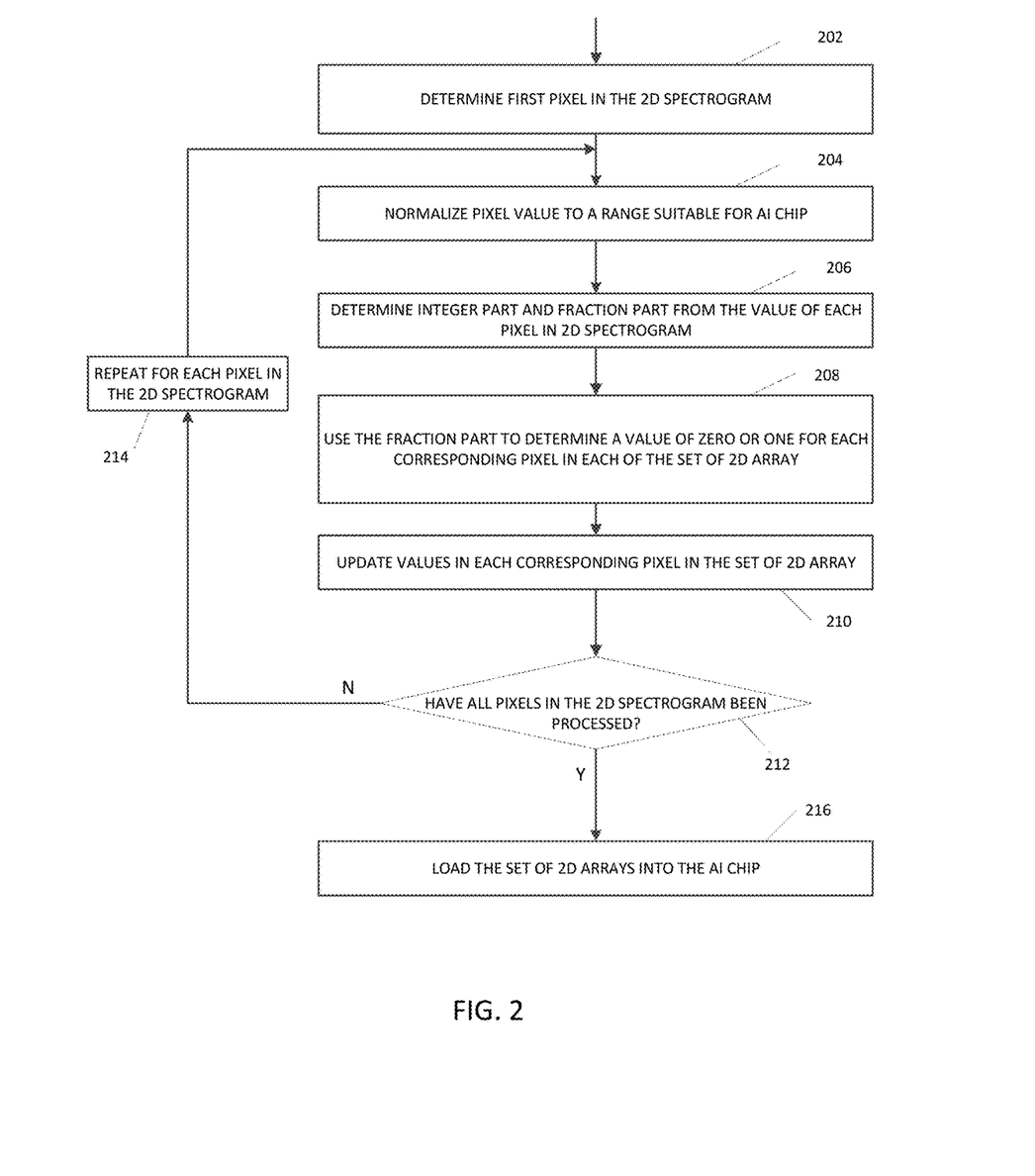
FIGS. 2-3 illustrate diagrams of various examples of processes for encoding audio data into an AI chip.
Figure 3:
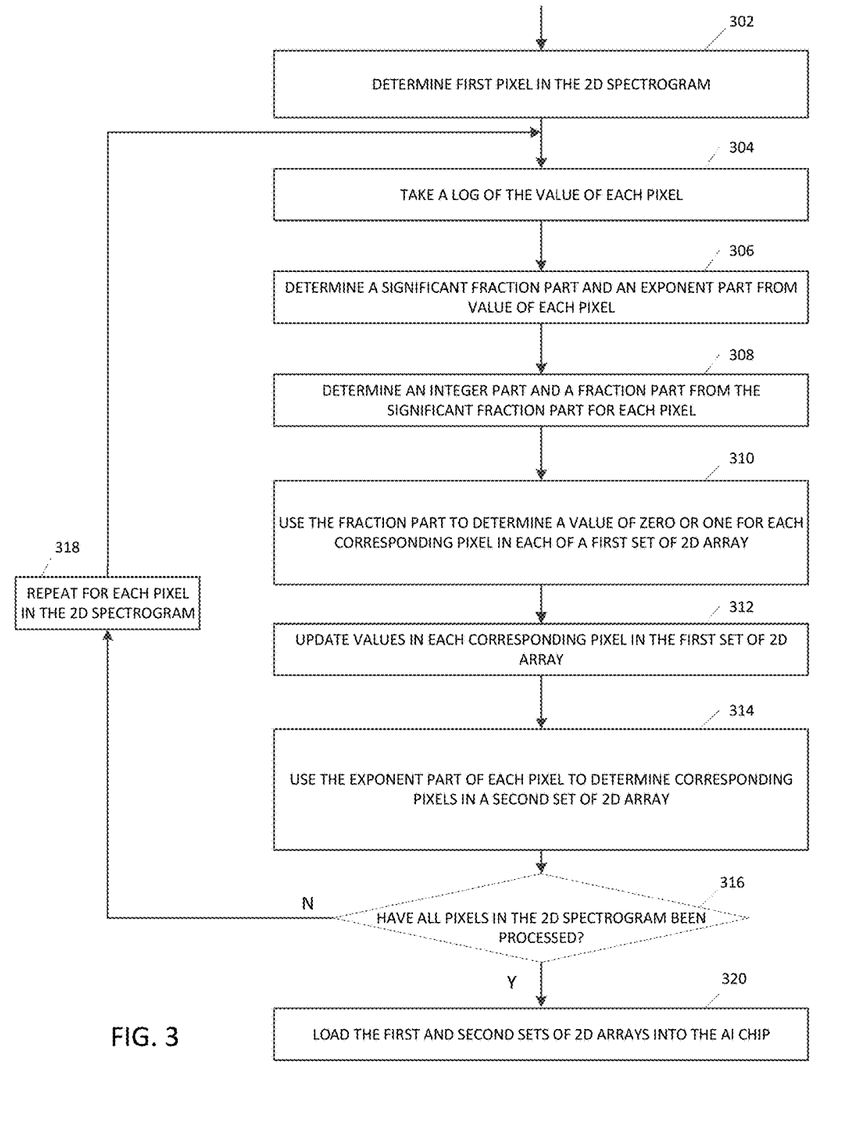

In FIG. 2, in a non-limiting example in which the 2D frequency-time array is a 2D spectrogram, each pixel in the 2D spectrogram may be approximated by an average of corresponding values in the set of 2D arrays. In other words, a value of a higher precision can be approximated by an average of multiple values with a lower precision. For example, a 5-bit data may represent a value from 0 to 31. The value of this 5-bit data may be used to represent a value with a higher precision. In another example, the average of three 5-bit numbers 30, 30 and 30 is 30; the average of 31, 30 and 30 is 30.33; the average of 31, 31 and 30 is 30.66; and the average of 31, 31 and 31 is 31, which may require more than 5 bits to store. As such, the average of three 5-bit data may achieve a higher precision than a single 5-bit data.

Accordingly, an encoding method may represent a single array of values with higher precision value with multiple arrays of values with lower precision that are suitable for the AI chip. In some embodiments, an encoding method may include, for each pixel in the 2D spectrogram: determining an integer part and a fraction part from each pixel value in the 2D spectrogram 206; using the fraction part to determine a value of zero or one for corresponding pixels in each of the set of 2D arrays 208, where an average value of the corresponding pixels in the set of 2D arrays is approximate to each pixel value in the 2D spectrogram; and updating the values for the corresponding pixels in each of the set of 2D arrays 210 by adding thereto the integer part. The encoding method may determine a first pixel (e.g., the top left pixel) in the 2D spectrogram 202, repeat the steps of 206, 208, and 210 for each pixel in the 2D spectrogram 214 (e.g., repeat each row in a row-by-row fashion) until all of the pixels in the 2D spectrogram have been processed 212. Once the encoding method finishes processing all of the pixels in the 2D spectrogram, the set of 2D arrays is built. The process may further load the set of 2D arrays into the AI chip 216. The above described method repeats each pixel in a pixel-by-pixel fashion. Alternatively, it may be done in parallel so that all of the pixels are processed at once.

Now, block 208 is further explained with an example. Suppose a pixel in the 2D spectrogram has a value of 30.35, block 208 determines the integer part (i.e., 30) and the fraction part (i.e., 0.33). The encoding method may use the fraction part (i.e., 0.33) to determine the values of corresponding pixels in each of the set of 2D arrays. For example, the method may determine the values of corresponding pixels in 3 channels to have a value of either zero or one, such as [0 0 1], or [1 0 0], for each of which the average value of the corresponding pixels in the set of three 2D arrays (here, 0.33) is approximate to the fraction part of the pixel value (i.e. 0.35) in the 2D spectrogram. From the above example, whether the value of a corresponding pixel in any of the set of 2D arrays is zero or one, the value can be random as long as the average value of corresponding pixels in all 2D arrays is approximate to the fraction part of the pixel value in the 2D spectrogram. In this example, block 210 may further update the values in each 2D array by adding the integer part, i.e., 30. As such, the values for the 3 channels become [30 30 31] or [31 30 30].

In a non-limiting example, the encoding method may determine the corresponding pixels in the set of 2D arrays based on a function or a table. For example, the table below may be used to map the fraction part of any input pixel value to a set of 3 values for each of the three 2D arrays:

| Input fraction part | First array | Second array | Third array |
|---|---|---|---|
| 0 | 0 | 0 | 0 |
| 0.33 | 1 | 0 | 0 |
| 0.66 | 1 | 1 | 0 |
| 1 | 1 | 1 | 1 |

In the above example, the smallest difference of values in the 2D spectrogram is 0.33, thus, a fraction part, e.g., 0.35 is rounded down to 0.33, which is used as an entry to the table. That entry gives [1 0 0] for the first, second and third arrays, respectively. The above table may include other values as long as the average value for each row is approximate to the fraction part in the first input column. This table can also be expanded to generate a larger set of 2D arrays to accommodate more channels in the CeNN in the AI chip. For example, a table for four 2D arrays will have four columns of output values, one for each 2D array; and four rows with the input fraction part having a smallest value of 0.25 (i.e. ¼). In other examples, the table can be adapted to 8 channels or 16 channels as well.

In some scenarios, the encoding method may use a random value generator to generate the values of lower precision for multiple channels, where the average of the lower precision values will have a higher precision. For example, let the value of the input pixel be 134.482, then the method may use a random value generator to produce a sequence of random numbers, e.g., {134.0, 135.0, 133.0, 134.0, . . . } while the expected value (average) of the sequence is 134.482. Each value of that sequence may be represented fully by a low-bit number. The method may pre-define the variance of the random sequence, in this case, for example, a small number.

In some scenarios, the encoding method may optionally include normalizing the value of each pixel of the 2D spectrogram 204 to a real number in a range from zero to the depth of each channel in the AI integrated circuit (e.g., 5 bits) before generating the set of 2D arrays. This will allow the encoding method to maximize use of the available bit-width in the AI chip. Optionally, the encoding method may also include sampling the 2D spectrogram before using the 2D spectrogram to generate the set of 2D arrays. For example, to use the table in the above example, the encoding method may sample the intensity values of the 2D spectrogram to have a precision so that the smallest difference of values is about 0.33 before applying the table to the intensity values.

In some scenarios, the encoding method may use corresponding pixels in multiple channels of the AI chip to represent a pixel value in the 2D frequency-time array in floating point. In a non-limiting example, with reference to FIG. 3, an encoding method may include, for each pixel in the 2D spectrogram: determining a significant fraction part and an exponent part from each pixel value 306. For example, the significant fraction part and the exponent part may be respective parts in an IEEE 754 format. In that format, an intensity value in the spectrogram, such as 567, can be represented as $5.67 \times 10^2$. The method may use the significant fraction part (e.g., 5.67) to determine a first subset of 2D arrays and use the exponent part (e.g., 2) to determine a second subset of 2D arrays 314. The first subset and the second subset of 2D arrays may form the whole set of 2D arrays for which the total number of 2D arrays may be equal or less than the maximal number of channels in the AI chip. In some scenarios, if the maximum number of channels in the AI chip is 3, the number of arrays in the first and second subsets of 2D arrays may respectively be two and one. If the maximum number of channels in the AI chip is 16, the first and second subsets of 2D arrays may each have 15 and 1 arrays. Alternatively, the total number of 2D arrays may be less than the maximum number of channels in the AI chip, which allows the AI chip to 2D arrays generated from different encoding methods.

In some scenarios, the method may determine the first subset of 2D arrays so that the significant fraction part for each pixel in the 2D spectrogram is equal or approximate to an average value of corresponding pixels across all of the 2D arrays in the first subset. For example, the encoding method may include, for each pixel in the 2D spectrogram: determining an integer part and a fraction part from the significant fraction part of the value of each pixel 308; using the fraction part to a determine a value of zero or one for a corresponding pixel in each of the first subset of 2D arrays 310, where an average value of corresponding pixels in the first subset of 2D arrays is approximate to the fraction part; and updating the values for the corresponding pixels in each of the first subset of 2D arrays 312 by adding thereto the integer part. In determining corresponding pixels in the second set of 2D array 314, in some scenarios, the encoding method copy the exponent part of each pixel in the spectrogram to a corresponding pixel in the second set of 2D array. For example, the second set of 2D array may include one single array having a plurality of pixels, each pixel contains 5 bits which may accommodate up to a value of 32 for the exponent part.

The encoding method described above may determine a first pixel (e.g., the top left pixel) in the 2D spectrogram 302, repeat the steps of 306, 308, 310, 312, 314 for each pixel in the 2D spectrogram 318 (e.g., repeat each row in a row-wise fashion) until all of the pixels in the 2D spectrogram have been processed 316. Once the encoding method finishes processing all of the pixels in the 2D spectrogram, the set of 2D arrays is built. The method may further load the set of 2D arrays into the AI chip 320. The above described method repeats each pixel in a pixel-by-pixel fashion. Alternatively, it may be done in parallel so that all of the pixels are processed at once. The above illustrated encoding method in FIG. 3 may achieve a range from 0 to $2^{\wedge}(2^{**}5)=4.2\times10^{\wedge}9$, with an improved precision that gives the smallest difference of values of $\sim 2^{\wedge}-5=0.03$.

In some scenarios, the encoding method may optionally include taking a log of each pixel value in the 2D spectrogram 304 before determining the significant fraction part and the exponent part from the value of that pixel. This may help spread the intensity values in the spectrogram more evenly and maximize use of the limited channels available in the AI chip.

Now, other encoding methods are further described. In some scenarios, the encoding method may use various mapping functions (e.g., probability functions) to map an intensity value in the spectrogram into multiple arrays and load the multiple arrays into multiple channels in a CNN. For example, the mapping function may be based on the power in the spectrogram. The mapping function may also be based on the frequency in the spectrogram.

Figure 4A:
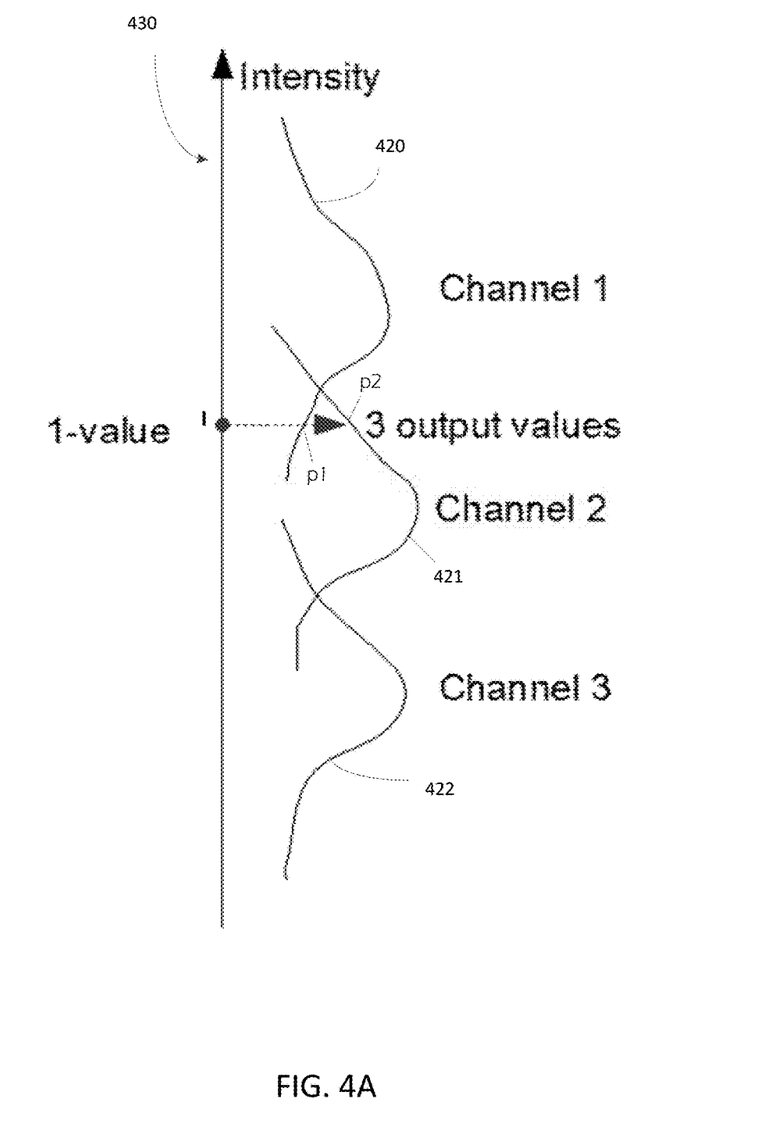
FIGS. 4A-4B illustrate diagrams of an example of a process for encoding audio data into an AI chip using power bands.

FIG. 4A illustrates an example of a probability function for intensity values used for representing input data by multiple channels. The entries of the function 430 represent a range of intensity values of an audio waveform, and the function may have multiple sub-functions, such as 420, 421, 422, each corresponding to a channel in the AI chip and each sub-function representing a sub-intensity band (i.e. power bands) of audio waveform with cross-overs between neighboring power bands as a smoothing function. For a given entry value I, the function may provide probability values for each of the sub-functions, in this example, p1 for the first sub-function 420, and p2 for the second sub-function 421. The probability value p3 (not shown) for the third sub-function 422 is zero in this example.

Figure 4B:
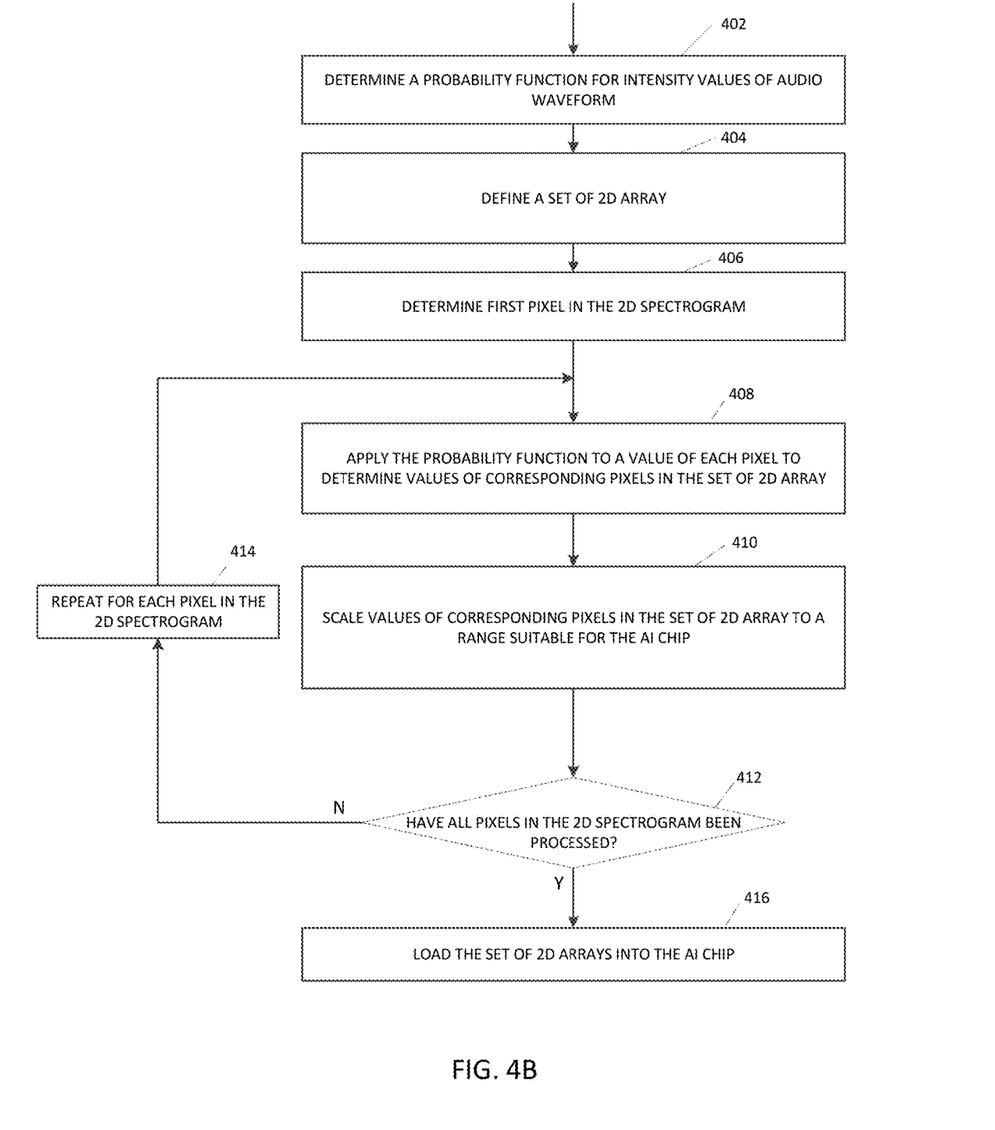

FIG. 4B illustrates an example of a process of encoding data using the probability function in FIG. 4A. In some scenarios, an encoding method based on the intensity (i.e. power) in the spectrogram may include: determining a probability function for intensity values of audio waveform 402; and defining the set of 2D arrays 404, where the number of arrays in the set of 2D arrays is equal to the number of sub-functions in the probability function. For example, if the maximum number of channels in the AI chip is 3, the probability function may correspondingly have 3 sub-functions and the number of arrays in the set of 2D arrays is 3.

For each pixel in the 2D spectrogram, the encoding method further apply the probability function to each pixel value to determine the values of corresponding pixels in the set of 2D arrays 408. In the above example in FIG. 4A, the values of corresponding pixels in each of the set of 2D arrays may be based on the probability values provided by each of the sub-functions. For example, for a pixel having intensity value I, the corresponding pixels in each of the set of 2D arrays may be I*p1/(p1+p2+p3), I*p2/(p1+p2+p3) and I*p3/(p1+p2+p3), respectively.

With further reference to FIG. 4B, the encoding method described above may determine a first pixel (e.g., the top left pixel) in the 2D spectrogram 406, repeat the step 408 for each pixel in the 2D spectrogram 414 (e.g., repeat each row in a row-by-row fashion) until all of the pixels in the 2D spectrogram have been processed 412. Once the encoding method finishes processing all of the pixels in the 2D spectrogram, the set of 2D arrays is built. The method may further load the set of 2D arrays into the AI chip 416. The above describes the process of repeating each pixel in a pixel-by-pixel fashion. Alternatively, it may be done in parallel in that all of the pixels are processed at once. Optionally, the encoding method may further scale the values in the set of 2D arrays to an integer within a range of a depth of each channel in the AI chip 410 before loading the set of 2D arrays into the AI chip.

Figure 5A:
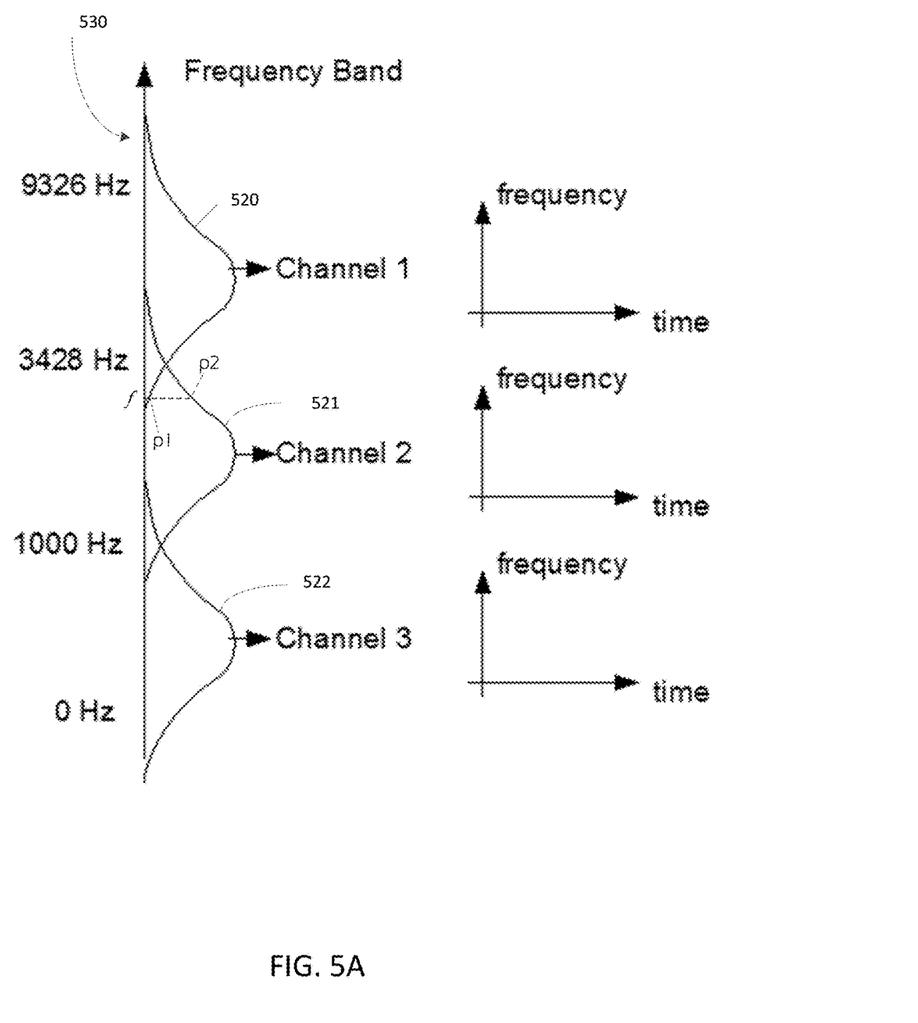
FIGS. 5A-5B illustrate diagrams of an example of a process for encoding audio data into an AI chip using frequency bands.

Now, an encoding method using a frequency mapping function for representing input data by multiple channels is explained with reference to FIGS. 5A and 5B. FIG. 5A illustrates an example of a frequency function. The entries of the function 530 represent a range of frequency values of an audio waveform, and the function may have multiple sub-functions, such as 520, 521, 522, each corresponding to a channel in the AI chip and each sub-function representing a sub-frequency band of audio waveform with cross-overs between neighboring frequency bands as a smoothing function. Similar to FIG. 4A, each entry value f may be mapped to multiple probability values for each of the sub-functions, such as p1 for the first sub-function 520, and p2 for the second sub-function 521.

Figure 5B:
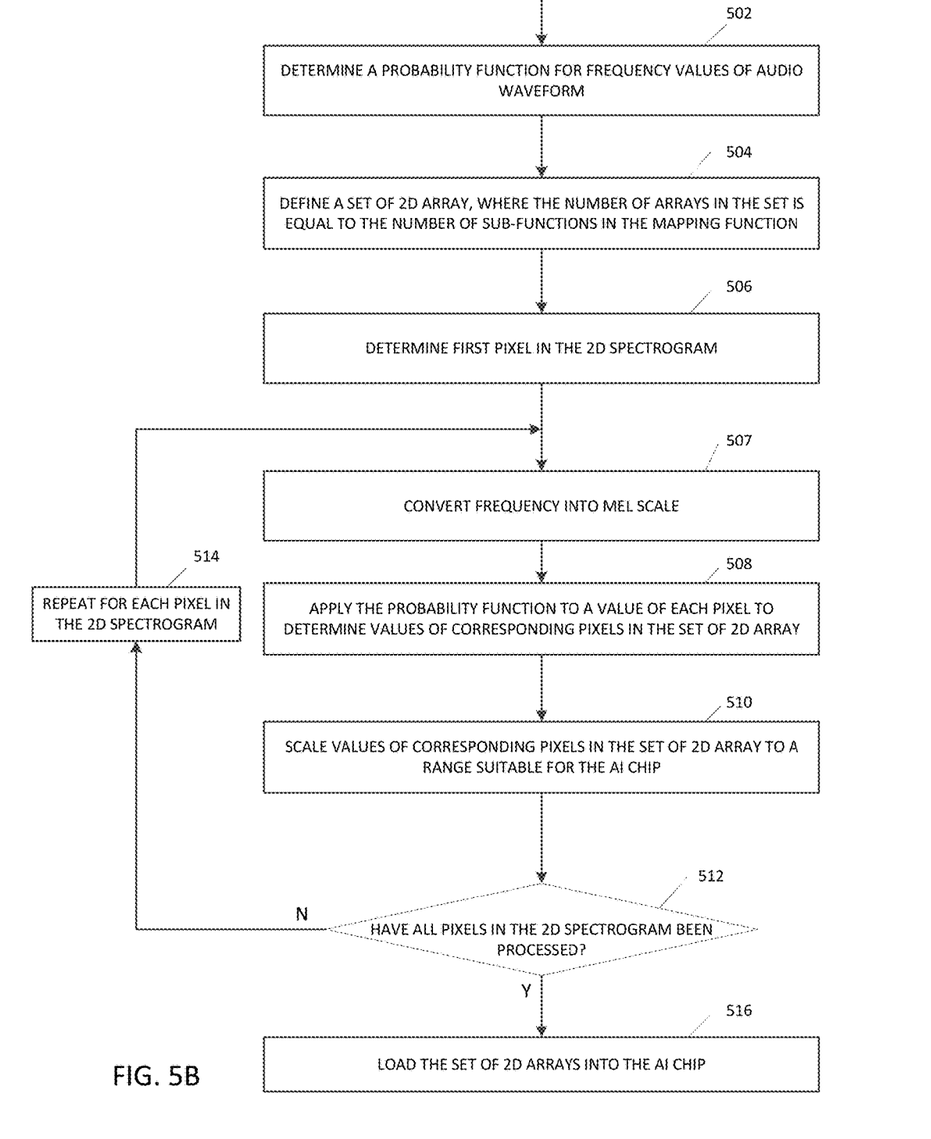

FIG. 5B illustrates an example of a process of encoding data using the probability function in FIG. 5A. In some scenarios, an encoding method based on the frequency in the spectrogram may include: determining a probability function for frequency values of audio waveform 502; and defining the set of 2D arrays 504, where the number of arrays in the set of 2D arrays is equal to the number of sub-functions in the probability function. For example, if the maximal number of channels in the AI chip is 3, the probability function may correspondingly have 3 sub-functions, and the number of arrays in the set of 2D arrays will be 3.

For each pixel in the 2D spectrogram, the encoding method further applies the probability function to each pixel value to determine the values of corresponding pixels in the set of 2D arrays 508, in a similar manner as described in FIG. 4B. For example, corresponding pixels in each of the set of 2D arrays for a given pixel having frequency f and intensity I in the spectrogram may be mapped to I*p1/(p1+p2+p3), I*p2/(p1+p2+p3) and I*p3/(p1+p2+p3), respectively, where p1, p2 and p3 are values of the probability function for frequency f (shown in FIG. 5A) and I is the intensity of each pixel in the 2D spectrogram.

Further, the encoding method described above may determine a first pixel (e.g., the top left pixel) in the 2D spectrogram 506, repeat the step 508 for each pixel in the 2D spectrogram 514 (e.g., repeat each row in a row-by-row fashion) until all of the pixels in the 2D spectrogram have been processed 512. Once the encoding method has finished processing all of the pixels in the 2D spectrogram, the set of 2D arrays is built. The process may further load the set of 2D arrays into the AI chip 516. The above described method repeats each pixel in a pixel-by-pixel fashion. Alternatively, it may be done in parallel so that all of the pixels are processed at once.

Optionally, the encoding method may further convert the frequency values in the spectrogram into a Mel scale 507. This may help spread out the pixel values in the spectrogram more evenly across various frequency bands. The Mel scale itself is a well-known logarithmic based algorithm for converting frequencies, and several Mel-scale formulas may exist. The encoding method may further scale the values in the set of 2D arrays to an integer within a range of a depth of each channel in the AI chip 510 before loading the set of 2D arrays into the AI chip.

The above illustrated embodiments in FIGS. 4A-4B and 5A-5B provide advantages over existing systems. Different intensities or frequencies in the input data are separated into multiple channels such that more bits are used to represent the input data, which results in an improvement of precision in the input data. Further, the separation of features in the input data, such as intensities or frequencies, allows various features of input data to be separated into different channels, which helps to improve the training/learning process associated with implementing any AI tasks. In these AI tasks, a learning process can be configured to use suitable features that can be separated into multiple channels. For example, an AI task that identifies a speaker identity may advantageously separate the frequencies in the input data into multiple channels because frequencies in a voice signal correspond more closely to the speaker identity than the intensities in the input data will do. As such, the separation of frequencies may be more suitable for a speaker identity task than the separation of intensities.

Figure 6:
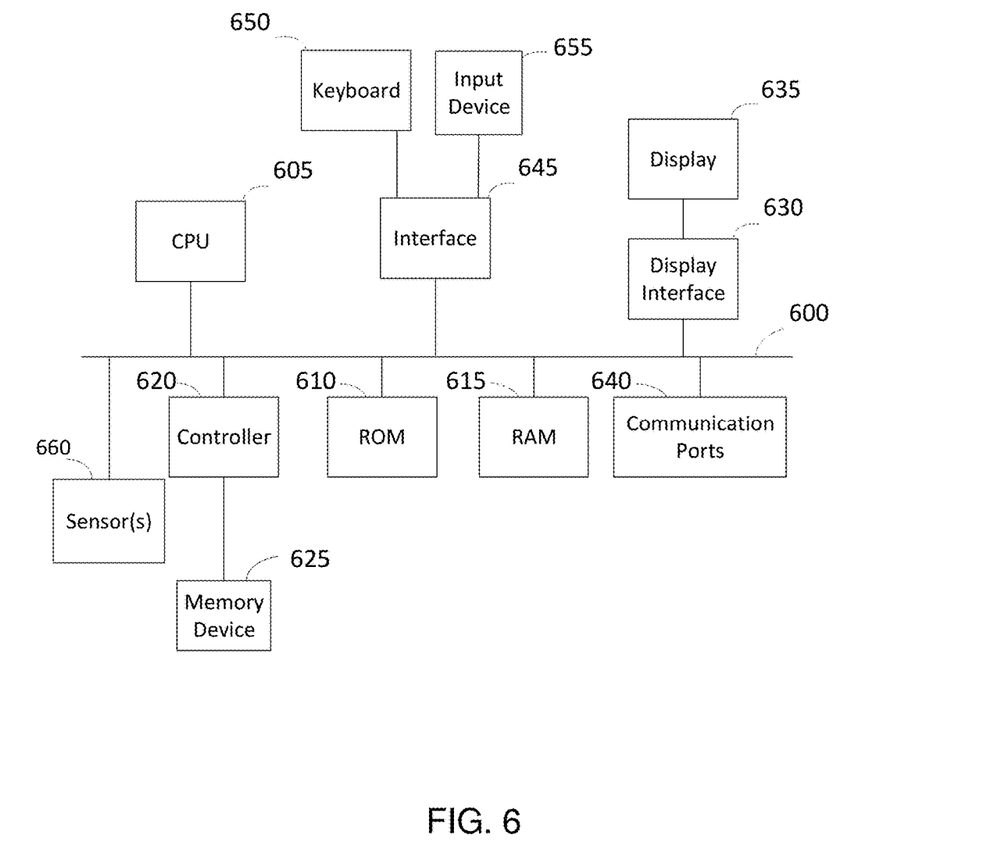
FIG. 6 illustrates various embodiments of one or more electronic devices for implementing the various methods and processes described herein.

FIG. 6 depicts an example of internal hardware that may be included in any electronic device or computing system for implementing various methods in the embodiments described in FIGS. 1-5. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives and other devices capable of storing electronic data constitute examples of memory devices 625. A memory device, also referred to as a computer-readable medium, may include a single device or a collection of devices onto which data and/or instructions are stored.

An optional display interface 630 may permit information from the bus 600 to be displayed on a display device 635 in a visual, graphic or alphanumeric format. An audio interface and an audio output (such as a speaker) also may be provided. Communications with external devices may occur using various communication devices 640 such as a transmitter and/or receiver, antenna, an RFID tag and/or short-range or near-field communication circuitry. A communication device 640 may be attached to a communications network, such as the Internet, a local area network (LAN) or a cellular telephone data network.

The hardware may also include a user interface sensor 645 that allows for receipt of data from input devices 650 such as a keyboard, a mouse, a joystick, a touchscreen, a remote control, a pointing device, a video input device and/or an audio input device, such as a microphone. Digital image frames may also be received from an imaging capturing device 655 such as a video or camera that can either be built-in or external to the system. Other environmental sensors 660, such as a GPS system and/or a temperature sensor, may be installed on system and communicatively accessible by the processor 605, either directly or via the communication device 640. The communication ports 640 may also communicate with the AI chip to upload or retrieve data to/from the chip. For example, the computer system may implement the encoding methods and upload the trained CNN weights or the set of 2D arrays for recognition to the AI chip via the communication port 640. The communication port 640 may also communicate with any other interface circuit or device that is designed for communicating with an integrated circuit.

Optionally, the hardware may not need to include a memory, but instead programming instructions are running on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a cellular neural network architecture may be residing in an electronic mobile device. The electronic mobile device may also have a voice or image capturing device, such as a microphone or a video camera for capturing input audio/video data, and use the built-in AI chip to generate recognition results. In some scenarios, training for the convolutional neural network can be done in the mobile device itself, where the mobile device captures or retrieves training data samples from a database and uses the built-in AI chip to perform the training. In other scenarios, training can be done in a service device or on a cloud. These are only examples of applications in which an AI task can be perform in the AI chip.

The various systems and methods disclosed in this patent document provide advantages over the prior art, whether standalone or combined. For example, data in the original audio waveform that has a higher precision may be represented by multiple channels of data having a lower precision that can be adapted to low bit-width architecture in the AI chip. As such, an AI chip with limited resources may be used to process data with higher precision. Input data can also be "augmented" so that the AI chip requires fewer training samples, while achieving higher accuracy and robustness to random noise. Further, data in the original audio waveform may be packed into the AI chip by various methods, such as dividing the input data into multiple power sub-bands or frequency sub-bands. This enables the AI chip to handle more packed data and yield higher accuracy in AI tasks.

The above illustrated embodiments are described in the context of implementing a convolutional neural network solution in an AI chip, but can also be applied to various other applications. For example, the current solution is not limited to implementing CNN but can also be applied to other algorithms or architectures inside a chip. The voice encoding methods can still be applied when the bit-width or the number of channels in the chip varies, or when the algorithm changes.

Other advantages can be apparent to those skilled in the art from the foregoing specification. Accordingly, it would be recognized by those skilled in the art that changes, modifications or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:
1. A method of encoding voice data for loading into an artificial intelligence (AI) integrated circuit, the method comprising:
- receiving, by a processor, voice data comprising at least a segment of an audio waveform;
- generating, by the processor, a two-dimensional (2D) frequency-time array comprising a plurality of pixels, each pixel having a value that represents an audio intensity of the segment of the audio waveform at a time in the segment and a frequency in the audio waveform;
- applying, by the processor, a probability function to the 2D frequency-time array to generate a set of 2D arrays comprising a number of 2D arrays, each 2D array having a plurality of pixels, each pixel having a value and corresponding to one of the plurality of pixels in the 2D frequency-time array, wherein:
    - the probability function comprises a plurality of entries representing a range of intensity values of the audio waveform, and for each entry, a probability value for each of a number of sub-functions, each sub-function representing a sub-intensity band of the audio waveform,
    - the number of 2D arrays in the set of 2D arrays is the number of sub-functions in the probability function, and
    - generating the set of 2D arrays comprises, for each pixel in the 2D frequency-time array, applying the probability function to a value of each pixel to determine values of corresponding pixels in the set of 2D arrays;
- loading the set of 2D arrays into the AI integrated circuit;
- by the AI integrated circuit, executing one or more programming instructions contained in the AI integrated circuit to feed the set of 2D arrays into an embedded cellular neural network architecture in the AI integrated circuit;
- generating a voice recognition result from the cellular neural network architecture based on the set of 2D arrays; and
- outputting the voice recognition result.

2. The method of claim 1, further comprising:
- receiving a set of sample training voice data comprising at least one sample segment of an audio waveform;
- using the set of sample training voice data to generate one or more sample 2D frequency-time arrays each comprising a plurality of pixels, each pixel having a value that represents an audio intensity of the sample segment of the audio waveform at a time in the sample segment and a frequency in the audio waveform;
- applying the probability function to each of the one or more sample 2D frequency-time arrays to generate a set of 2D training arrays, each 2D training array having a plurality of pixels, each pixel having a value and corresponding to one of the plurality of pixels in each sample 2D frequency-time array;
- using the set of 2D training arrays to train one or more weights of a convolutional neural network; and
- loading the one or more trained weights into the embedded cellular neural network architecture of the AI integrated circuit.

3. The method of claim 1, wherein the 2D frequency-time array is a 2D spectrogram.

4. The method of claim 1, further comprising scaling the values of each pixel in the set of 2D arrays to an integer within a range of a depth of each channel in the AI integrated circuit.

5. A method of encoding voice data for loading into an artificial intelligence (AI) integrated circuit, the method comprising:
- receiving, by a processor, voice data comprising at least a segment of an audio waveform;
- generating, by the processor, a two-dimensional (2D) frequency-time array comprising a plurality of pixels, each pixel having a value that represents an audio intensity of the segment of the audio waveform at a time in the segment and a frequency in the audio waveform;
- applying, by the processor, a probability function to the 2D frequency-time array to generate a set of 2D arrays comprising a number of 2D arrays, each 2D array having a plurality of pixels, each pixel having a value and corresponding to one of the plurality of pixels in the 2D frequency-time array, wherein:
    - the probability function comprises a plurality of entries representing a range of frequency values of the audio waveform, and for each entry, a probability value for each of a plurality of sub-functions, each sub-function representing a sub-frequency band of the audio waveform,
    - the number of 2D arrays in the set of 2D arrays is the number of sub-functions in the probability function, and
    - generating the set of 2D arrays comprises: for each pixel in the 2D frequency-time, applying the probability function to a value of each pixel to determine values of corresponding pixels in the set of 2D arrays;
- loading the set of 2D arrays into the AI integrated circuit;
- by the AI integrated circuit, executing one or more programming instructions contained in the AI integrated circuit to feed the set of 2D arrays into an embedded cellular neural network architecture in the AI integrated circuit;
- generating a voice recognition result from the cellular neural network architecture based on the set of 2D arrays; and
- outputting the voice recognition result.

6. The method of claim 5, wherein the 2D frequency-time array is a 2D spectrogram.

7. The method of claim 5, further comprising scaling the values of each pixel in the set of 2D arrays to a an integer within a range of a depth of each channel in the AI integrated circuit.

8. The method of claim 6, further comprising scaling each value of the pixel in the 2D spectrogram by using a Mel scale formula before generating the set of 2D arrays.

9. A system for encoding voice data for loading into an artificial intelligence (AI) integrated circuit, the system comprising:
- a processor; and
- a non-transitory computer readable medium containing programming instructions that, when executed, will cause the processor to:
    - receive voice data comprising at least a segment of an audio waveform,
    - generate a two-dimensional (2D) frequency-time array comprising a plurality of pixels, each pixel having a value that represents an audio intensity of the segment of the audio waveform at a time in the segment and a frequency in the audio waveform, apply a probability function to the 2D frequency-time array to generate a set of 2D arrays comprising a number of 2D arrays, each 2D array having a plurality of pixels, each pixel having a value and corresponding to one of the plurality of pixels in the 2D frequency-time array, wherein:

the probability function comprises a plurality of entries representing a range of intensity values of the audio waveform, and for each entry, a probability value for each of a number of sub-functions, each sub-function representing a sub-intensity band of the audio waveform;

the number of 2D arrays in the set of 2D arrays is the number of sub-functions in the probability function; and programming instructions for generating the set of 2D arrays comprise programming instructions configured to, for each pixel in the 2D frequency-time array, apply the probability function to a value of each pixel to determine values of corresponding pixels in the set of 2D arrays, and load the set of 2D arrays into the AI integrated circuit;
wherein the AI integrated circuit comprises:
an embedded cellular neural network architecture, and
one or more programming instructions configured to:
feed the set of 2D arrays into the embedded cellular neural network architecture in the AI integrated circuit;
generate a voice recognition result from the cellular neural network architecture based on the set of 2D arrays; and
output the voice recognition result.

10. The system of claim 9, further comprising additional programming instructions configured to:
receive a set of sample training voice data comprising at least one sample segment of an audio waveform;
use the set of sample training voice data to generate one or more sample 2D frequency-time arrays each comprising a plurality of pixels, each pixel having a value that represents an audio intensity of the sample segment of the audio waveform at a time in the sample segment and a frequency in the audio waveform;
apply the probability function to each of the one or more sample 2D frequency-time arrays to generate a set of 2D training arrays, each 2D training array having a plurality of pixels, each pixel having a value and corresponding to one of the plurality of pixels in each sample 2D frequency-time array;
use the set of 2D training arrays to train one or more weights of a convolutional neural network; and
load the one or more trained weights into the embedded cellular neural network architecture of the AI integrated circuit.

11. The system of claim 9, wherein the 2D frequency-time array is a 2D spectrogram.

12. The system of claim 9, further comprising additional programming instructions configured to scale the values of each pixel in the set of 2D arrays to an integer within a range of a depth of each channel in the AI integrated circuit.

13. A system for encoding voice data for loading into an artificial intelligence (AI) integrated circuit, the system comprising:
a processor; and
a non-transitory computer readable medium containing programming instructions that, when executed, will cause the processor to:
receive voice data comprising at least a segment of an audio waveform,
generate a two-dimensional (2D) frequency-time array comprising a plurality of pixels, each pixel having a value that represents an audio intensity of the segment of the audio waveform at a time in the segment and a frequency in the audio waveform,
apply a probability function to the 2D frequency-time array to generate a set of 2D arrays comprising a number of 2D arrays, each 2D array having a plurality of pixels, each pixel having a value and corresponding to one of the plurality of pixels in the 2D frequency-time array, wherein:

the probability function comprises a plurality of entries representing a range of frequency values of the audio waveform, and for each entry, a probability value for each of a plurality of sub-functions, each sub-function representing a sub-frequency band of the audio waveform;

the number of 2D arrays in the set of 2D arrays is the number of sub-functions in the probability function; and programming instructions for generating the set of 2D arrays comprise programming instructions configured to, for each pixel in the 2D frequency-time, apply the probability function to a value of each pixel to determine values of corresponding pixels in the set of 2D arrays, and load the set of 2D arrays into the AI integrated circuit;
wherein the AI integrated circuit comprises:
an embedded cellular neural network architecture, and
one or more programming instructions configured to:
feed the set of 2D arrays into the embedded cellular neural network architecture in the AI integrated circuit;
generate a voice recognition result from the cellular neural network architecture based on the set of 2D arrays; and
output the voice recognition result.

14. The system of claim 13, wherein the 2D frequency-time array is a 2D spectrogram.

15. The system of claim 13, further comprising additional programming instructions configured to scale the values of each pixel in the set of 2D arrays to a an integer within a range of a depth of each channel in the AI integrated circuit.

16. The system of claim 14, further comprising additional programming instructions configured to scale each value of the pixel in the 2D spectrogram by using a Mel scale formula before generating the set of 2D arrays.

* * * * *